United States Patent [19]

Stöcker et al.

[11] Patent Number: 5,735,511

[45] Date of Patent: Apr. 7, 1998

[54] SELF-ADJUSTING STOP MEANS FOR CUSHIONING

[75] Inventors: Jürgen Stöcker, Eisingen; Günter Wibrow, Norderstedt, both of Germany

[73] Assignee: ITW-ATECO GmbH, Norderstedt, Germany

[21] Appl. No.: 628,423

[22] Filed: Apr. 5, 1996

[30] Foreign Application Priority Data

Apr. 22, 1995 [DE] Germany .................. 195 14 994.0

[51] Int. Cl.⁶ .................. E16F 5/06; E05F 5/06
[52] U.S. Cl. .................. 267/140.13; 267/136; 267/141.3; 292/DIG. 14; 248/569; 403/329
[58] Field of Search .................. 267/134, 136, 267/137, 139, 140, 140.11, 140.13, 141.3, 141.4, 153; 248/414, 569; 403/326, 329; 49/138; 292/DIG. 14, DIG. 73

[56] References Cited

U.S. PATENT DOCUMENTS

| | | |
|---|---|---|
| 4,218,599 | 8/1990 | Garn .................. 267/140 |
| 4,624,493 | 11/1986 | Hilebraud et al. .................. 267/140 |
| 4,824,281 5,142,989 | K2t5982 | Doherty et al. 292/DIG. 14 |
| 5,419,539 | 5/1995 | Bressler .................. 267/140 |

FOREIGN PATENT DOCUMENTS

| | | |
|---|---|---|
| 580485 | 7/1959 | Canada .................. 292/DIG. 14 |
| 0 336 833 | 10/1989 | European Pat. Off. . |
| 582762 | 6/1924 | France .................. 292/DIG. 14 |
| 3113091 | 10/1982 | Germany .................. 292/DIG. 14 |
| 1263256 | 2/1972 | United Kingdom .......... 292/DIG. 14 |

*Primary Examiner*—Robert J. Oberleitner
*Assistant Examiner*—Chris Schwartz
*Attorney, Agent, or Firm*—Schwartz & Weinrieb

[57] ABSTRACT

The present invention relates to a self-adjusting stopper for dampening movable parts, in particular for lids, hoods or the like in automotive vehicles, and comprises a stop element, a casing, a clamping element and a coupling element in cooperative relationship. Initially the stop element projects a maximum distance out of the casing. By closing the part which has to be dampened, for example the hood of an automotive vehicle, the stop element becomes displaced into the casing. After opening the lid, the clamping element is locked to the stop element by rotating the coupling element to axially adjust the stop element within the casing. A further adjustment is not required. According to the invention, the stop element will be automatically adjusted in a proper axial position by just closing and opening the lid.

20 Claims, 3 Drawing Sheets

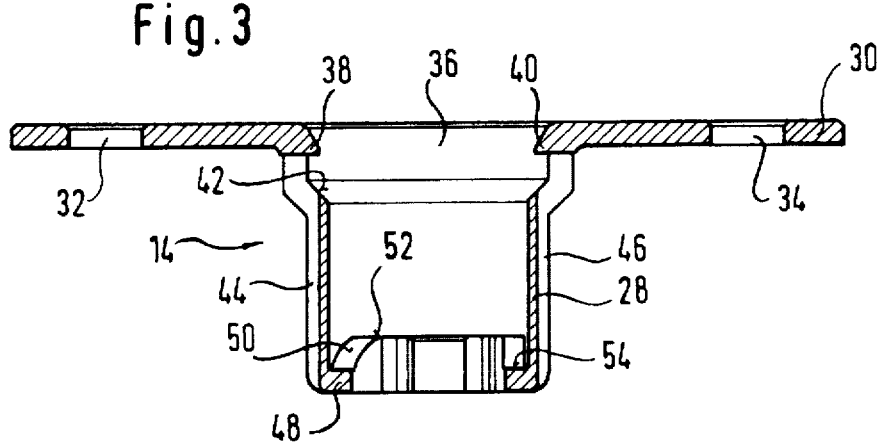
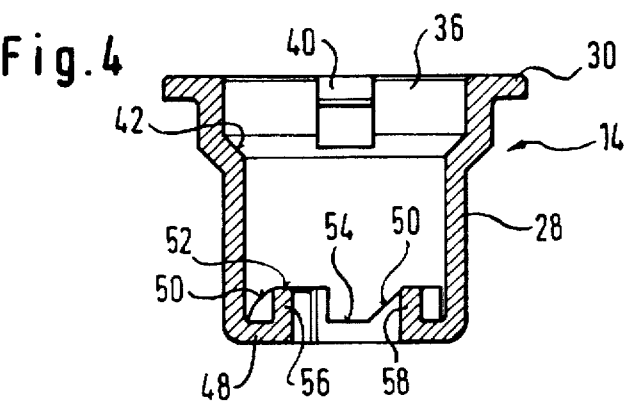
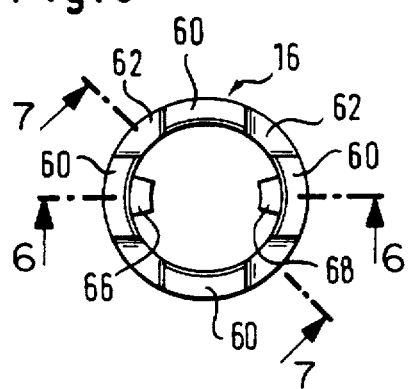
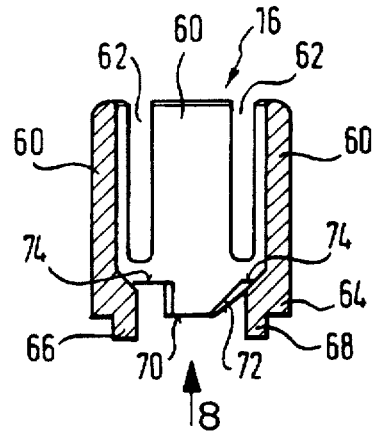
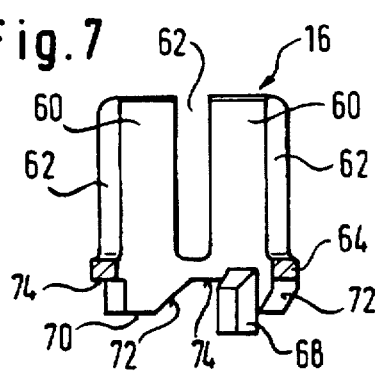
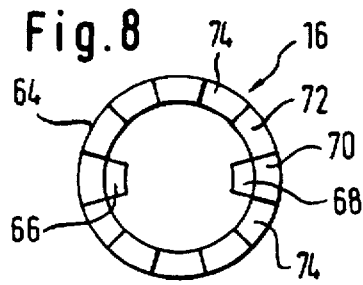

※5,735,511

SELF-ADJUSTING STOP MEANS FOR CUSHIONING

FIELD OF THE INVENTION

The present invention relates to a self-adjusting dampening and stopping system to be engaged by movable parts, in particular by lids or trunks of automotive vehicles or the like.

BACKGROUND OF THE INVENTION

Movable parts of vehicles such as the engine hood, rear lid or the like will be regularly held in the closed position by some dampening means to eliminate noise in being subjected to shocks and vibrations. Accordingly, dampening stop elements are conventional which are engaged by the hood in the closed position. The hood as well as the dampening stop are subject to tolerances. Thus it may happen that the movable member does not appropriately engage the damper or, alternately, cannot properly close when the damper projects too little or too far. It is thus required to provide an adjustment for dampers of this type such that the damper is adjusted to a predefined position with respect to the member to be engaged. Any adjusting steps in assembling are relatively time-consuming, however.

OBJECTS OF THE INVENTION

An object of the invention is to provide a self-adjusting stop and dampening system to be engaged by movable members, in particular by automotive lids. A further object is to provide a system of this type which can be easily assembled and which eliminates the need for additional adjustments.

SUMMARY OF THE INVENTION

According to the invention, the shaft of a damping element is located in a casing which is to be attached to the member to be dampened. A clamping element including a clamping portion is arranged in the casing. The clamping portion cooperates with the shaft of the damping element. The shaft of the damping element will be engaged by the clamping element in any optional position at which it is to be locked. The clamping element cooperates in turn with a coupling element which is rotatably mounted outside the casing and which includes an opening for the shaft of the damping element extending therethrough. The coupling element includes a ramp or control surface cooperating with the clamping portion such that in rotating the coupling element the clamping portion cooperates with the shaft of the damping element in a clamping fashion.

When assembling the damping element it projects from the casing by a maximum allowable distance. When closing the member to be dampened, for example a lid, the damping element is pressed into the casing. After opening the member the clamping portion may be clamped to the shaft by rotating the coupling member such that the shaft and thus the damping element are axially locked with respect to the casing. A further adjusting step is not required anymore. Rather, the system according to the invention has the advantage that the damping element will be adjusted to the proper position by a single closing and opening of the movable member, whereupon the damping element is fixed in this position.

In order to counteract noise resulting from vibrations or shocks, it is appropriate to create a certain bias force by overcoming a predetermined counterforce acting on the damping element when the movable member is closed. For this it should be understood that the damping element includes an elastomeric portion which yields somewhat when closing the member. In this connection the invention further provides for the feature that the clamping element is rotatably supported in the casing and includes a control portion which is located at the end opposite the opening and wherein the control portion cooperates with a complementary control portion of the casing such that in rotating the clamping element the latter will be displaced axially towards the opening. The motion of the clamping element serves to accomplish two functions. First, the clamping portion can be pressed towards a conical cam face of the coupling element to provide for clamping of the shaft of the damping element. Second, by axially moving the clamping element, the damping element is displaced by a predetermined distance out from the casing so as to create the bias force required.

According to a further feature of the invention the coupling element includes a wrench engaging surface, for example a hexagon integrally formed thereon. It should be observed that the coupling element as well as the other members are preferably made from an appropriate plastic material.

According to a further feature of the invention, an annular groove may be provided which is engaged by a projection of the casing or, respectively, of the opening thereof. To obtain the engagement, the annular groove includes a recess through which the radial projection may engage the annular groove. The coupling element preferably engages the casing through a flange at the outside of the casing.

According to a further embodiment of the invention, the coupling portion is provided with a plurality of legs extending parallel to the longitudinal axis which legs are substantially positively locked between clamping portions of the clamping element which extend parallel to the longitudinal axis. The clamping portions of the clamping element thus function as resilient portions for clamping engagement with the shaft of the damping element on the one hand and, on the other hand, they function as coupling portions when rotating the coupling element. For obtaining an axial displacement of the clamping element, the control portion of the casing preferably includes ramp portions cooperating with ramp portions of the clamping element.

Adjacent the control portion, the clamping element preferably comprises at least a stop cooperating with a counterstop of the casing adjacent the control portion such that the rotation of the clamping element is restricted when having reached its maximum position at a predetermined rotational angle. Accordingly, the clamping element when being further rotated cannot be readjusted in the reverse direction by the axial force acting thereon.

The damping element preferably includes a relatively rigid core while the head is provided with a deformable elastomeric layer. Preferably the shaft is also provided with a resilient area cooperating with the clamping portion of the clamping element to provide an increased clamping force.

BRIEF DESCRIPTION OF THE DRAWINGS

The foregoing and other objects, features and advantages of the present invention will become apparent in light of the following detailed description of an exemplary embodiment thereof, as illustrated in the accompanying drawings, in which like reference characters designate like or corresponding parts throughout the several views, and wherein:

DESCRIPTION OF THE DRAWINGS

Figure 1:
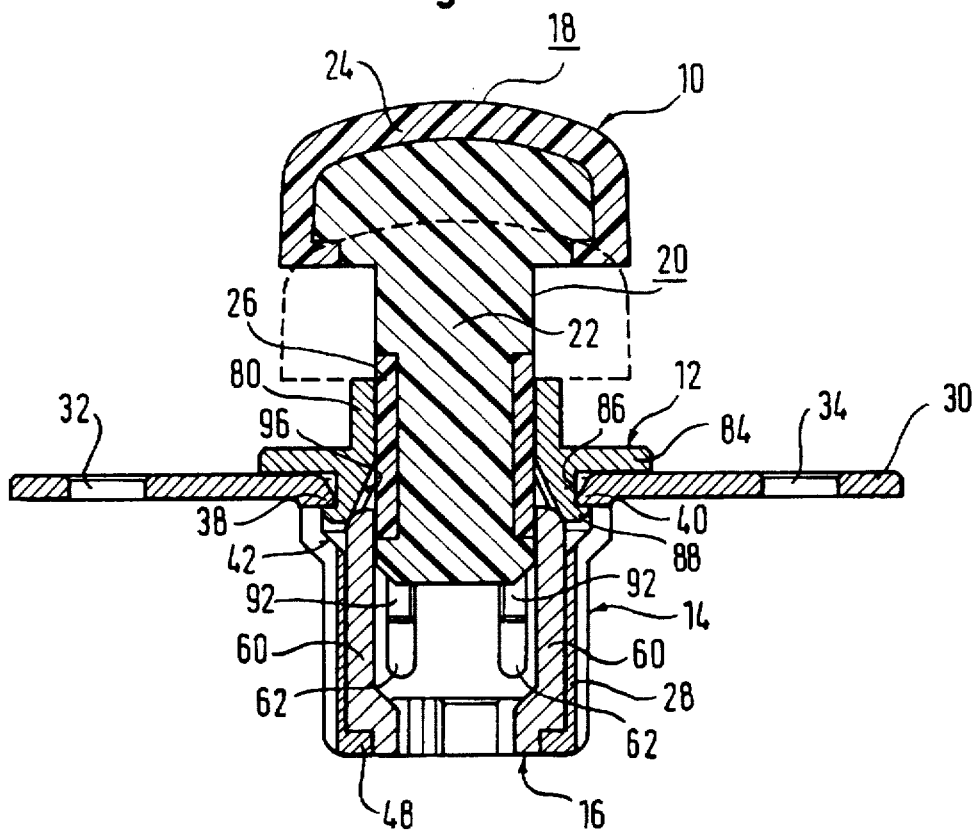

FIG. 1 is a sectional view of a stop according to the invention.

Figure 2:
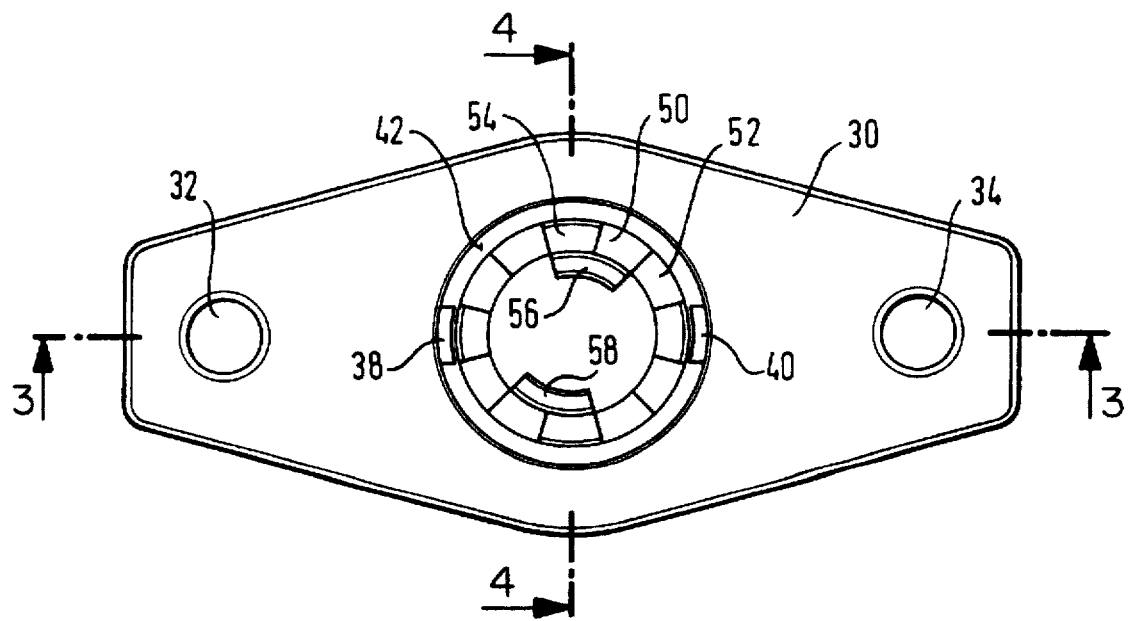

FIG. 2 is a top view of the casing of the stop shown in FIG. 1.

FIG. 3 is a sectional view taken along line 3—3 in FIG. 2.

FIG. 4 is a sectional view taken along line 4—4 in FIG. 2.

FIG. 5 is a top view of the clamping element of the stop shown in FIG. 1.

FIG. 6 is a sectional view taken along the line 6—6 in FIG. 5.

FIG. 7 is a sectional view taken along the line 7—7 in FIG. 5.

FIG. 8 is a bottom view of the clamping element shown in FIG. 6.

Figure 9:
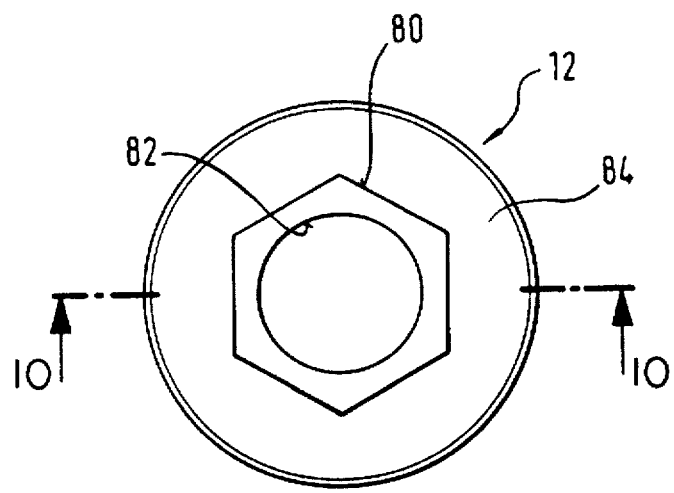

FIG. 9 is a top view of the coupling element of the stop shown in FIG. 1.

Figure 10:
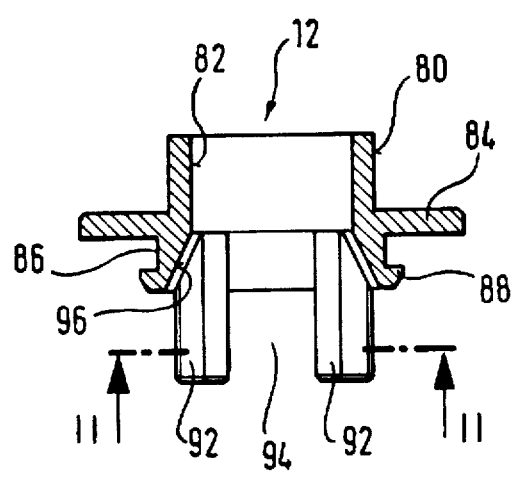

FIG. 10 is a sectional view taken along line 10—10 in FIG. 9, and

Figure 11:
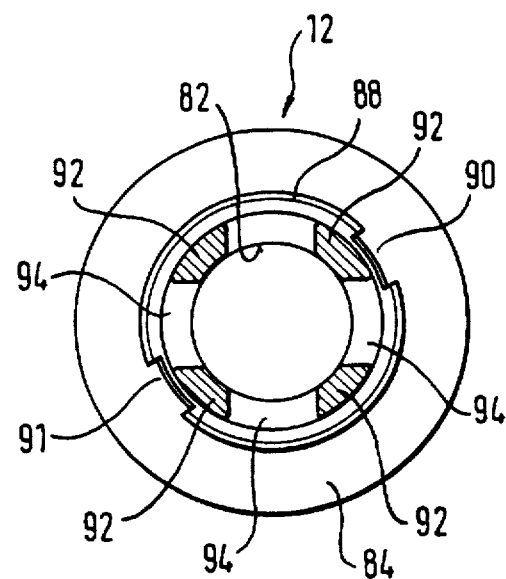

FIG. 11 is a sectional view taken along line 11—11 in FIG. 10.

DESCRIPTION OF THE PREFERRED EMBODIMENTS

The stop system shown in FIG. 1 is made up of four elements, that is, a stop element 10, a coupling element 12, a casing 14 and a clamping element 16. Except for the stop element 10 all the remaining elements are shown in the drawings.

The stop element 10 includes a head 18 and a shaft 20. The head 18 and the shaft 20 include a relatively rigid core 22 made of an appropriate plastic material. The head 18 is coated with an appropriate elastomeric material 24. A ring 26 made of a similar material is embedded in the shaft 20.

The casing 14 comprises a cup-shaped member 28 and a flange 30. The elongated flange 30 integrally formed at the open end of the cup-shaped member 28 has an opening 32 and 34 located in a respective terminal portion. The openings 32 and 34 function to secure the casing 14 to a lid of a trunk or to a hood of an automotive vehicle. As FIGS. 3 and 4 show, the cylindrical cup-shaped member 28 comprises a pair of diametrically opposed lugs 38, 40 extending towards a receiving opening 36 of the flange 30 which lugs 38 and 40 extend radially inwardly and are tapered inwardly. A conical, annular shoulder 42 extends below the lugs 38, 40. As to forming the lugs 38, 40 the member 28 includes diametrically opposed grooves 44, 46 (FIG. 3) below the lugs 38, 40. The grooves 44 and 46 are immaterial with respect to the function of the system described.

The bottom 48 of the cup-shaped member 28 has a central opening which is restricted. Control portions are provided along the edge thereof, that is, four control portions each extending over a peripheral angle of 90°. The control portions comprise a ramp portion 50, a raised portion 52 and a lowered portion 54. The ramp portion 50 slopes from the lower portion 54 towards the raised portion 52. The raised portion 52 is followed clockwise by a lowered portion 54 and so on. Diametrically opposed stop portions 56, 58 are provided radially within the portions referred to. As FIG. 1 shows, the clamping element 16 is externally shaped such that it has a complementary shape with respect to the interior of the cup-shaped member 28. Four legs 60 offset around 90° and defining a gap 62 therebetween, as best seen in FIGS. 5–7, function as a clamping portion. The inner and outer peripheries of the legs 60 are circular. The spaces defined by the gaps 62 are trapezoids (FIG. 5). The lower ends of the legs 60 carry an integral ring portion 64 including a pair of diametrically opposed, radially inwardly extending stop portions 66, 68. As FIG. 8 shows, the lower side of the ring portion 64 includes four control portions each extending around a peripheral angle of 90°. The control portions comprise raised portions 70, a ramp portion 72 and a lowered portion 74. The ramp portion 72 slopes from the lowered portion 74 to the raised portion 70. The raised portion 70 is followed clockwise by a lowered portion 74 and so on.

The control portions of the clamping element 16 have a complementary shape with respect to the bottom of the cup-shaped member 28 of the casing 14. However, this is only true when the clamping element 16 occupies a predetermined position of rotation. When the clamping element 16 is in this position and is rotated clockwise, the ramp portions 72 of the clamping element 16 move along the ramp portions 50 of the casing 14 such that the clamping element 16 will be axially displaced towards the opening 36 of the casing 14. While rotating the clamping element 16 this displacement will be continued until the raised portion 70 of the clamping element 16 engages the raised portions 52 of the casing 14. Further rotation will be prevented by the stop portions 56, 58 or 66, 68.

The coupling element 12 includes an upper hexagonal portion 80 which can be engaged by a wrench. A cylindrical bore 82 is provided within the hexagonal portion 80, as seen in FIGS. 10 and 11. A circular flange 84 is integrally formed upon the lower end of the hexagonal portion 80. Below the flange 84 there is a cylindrical portion defining an annular groove 86 which is defined by the upper flange 84 and a lower annular rib 88. As FIG. 11 shows, the rib 88 is interrupted by diametrically opposed recesses 90, 91. As FIGS. 10 and 11 show, the lower region carries four legs 92 each of them about 90° and being parallel to the longitudinal axis and defining gaps 94 therebetween. The legs 92 are shaped such that they mate with the gaps 62 of the clamping element 16 when being inserted as FIG. 1 shows. Arcuate ramp surfaces 96 which are conically extending are interposed between the legs 92.

When assembling the stop system shown in FIG. 1, initially the clamping element 16 will be inserted into the casing 14 wherein the control portions of the casing 14 and the clamping element 16 complementarily engage each other. Thereafter, the coupling element 12 will be placed into the opening 36 of the casing 14 such that the recesses 90, 91 are aligned with respect to the radial projections 38, 40 of the casing 14. Thus the projections 38, 40 are disposed within the groove 86. When the coupling element 12 is then rotated, the projections 38, 40 move in the groove 86. When inserting the coupling element 12 it should be observed that the legs 92 of the coupling 12 element are first placed between the gaps 62 of the clamping element 16. Subsequently the shaft 20 of the damping or stop element 10 will be inserted through the bore 82 of the coupling element 12 and into the clamping element 16. The outer periphery of the shaft 20 substantially corresponds to the inner periphery of the clamping element 16 defined by the legs 60. The shaft 20, however, will not be completely inserted as FIG. 1 shows. In this position the system having been installed at the service location will be automatically adjusted. For accomplishing this, the lid will be closed such that the head 18 of the damping or stop element 10 is engaged thereby. The damping or stop element 10 will thus be displaced downwardly as FIG. 1 shows in broken lines. Subsequently the lid will be opened again and the coupling element 12 will be rotated clockwise by means of a wrench engaging the hexagonal pattern 80 until the raised portions 70 and 52 of the clamping element 16 and the casing 14 lie above each other. While performing this displacement, the upper rounded ends of the legs 60 of the clamping element 16 slide along the conical portions 96 of the coupling element 12 and will be bent radially inwardly in clamping engagement with the shaft 20 of the damping or stop element 10. By reason of the axial displacement of the clamping element 16, the damping or stop element 10 will be automatically taken along for a predetermined distance, that is the damping or stop element 10 will be readjusted in an outer position. In this way the stop system is subjected to a bias force.

We claim:

1. A self-adjusting stop system for positionally determining a limit stop for a movable element, comprising:

a housing;

a stop element axially movable within said housing between a first non-limiting position and a second position at which said stop element comprises a limit stop for a movable element;

a clamping element axially movable within said housing between a first position at which said clamping element is disengaged from said stop element so as to permit said stop element to undergo movement within said housing between said first non-limiting position and said second limit stop position, and a second position at which said clamping element is engaged with said stop element so as to fix said stop element at said second position at which said stop element comprises said limit stop for a movable element;

a coupling element rotatably fixed with respect to said clamping element and rotatably mounted upon said housing;

first means defined between said coupling element and said clamping element for causing radially inward movement of a portion of said clamping element; and second means defined between said clamping element and said housing for causing axial movement of said clamping element with respect to said coupling element, whereupon axial movement of said stop element from said first non-limiting position to said second limit stop position, and subsequent rotation of said coupling element, and said clamping element rotatably fixed to said coupling element, with respect to said housing, said second means defined between said clamping element and said housing causes axial movement of said clamping element with respect to said coupling element while said first means defined between said coupling element and said clamping element causes radially inward movement of said portion of said clamping element such that said portion of said clamping element engages said stop element so as to fix said stop element at said second limit stop position.

2. A stop system as set forth in claim 1, wherein:

said first means defined between said coupling element and said clamping element comprises inclined cam surface means defined upon said coupling element for engaging end surface means defined upon a first end portion of said clamping element.

3. A stop system as set forth in claim 2, wherein:

said second means defined between said clamping element and said housing comprises first and second inclined ramp cams defined upon a second end portion of said clamping element and said housing.

4. A stop system as set forth in claim 1, wherein:

said stop element comprises a shank portion disposed within said housing, and a head portion comprising said limit stop for a movable element when said shank portion of said stop element is fixed at said second position within said housing as a result of being clampingly engaged by said radially inwardly moved portion of said clamping element.

5. A stop system as set forth in claim 4, wherein:

said stop element comprises a substantially rigid core defining said head portion and said shank portion;

said head portion is covered with an elastomeric material; and an annular region of said shank portion, which is clampingly engaged by said portion of said clamping element, is surrounded by an elastomeric material.

6. A stop system as set forth in claim 1, wherein:

said coupling element comprises a plurality of axially extending legs; and said clamping element comprises a plurality of axially extending slots within which said axially extending legs of said coupling element are disposed for preventing relative rotation between said coupling element and said clamping element and yet permitting relative axial movement of said clamping element with respect to said coupling element.

7. A stop system as set forth in claim 1, wherein:

said housing comprises a flange portion; and said coupling element comprises an annular groove within which an edge portion of said flange portion of said housing is disposed such that said coupling element is rotatably mounted upon said housing.

8. A stop system as set forth in claim 1 wherein:

an external portion of said coupling element has a substantially hexagonal configuration for facilitating rotation of said coupling element by a wrench tool.

9. A self-adjusting stop system for positionally determining a limit stop for a movable element, comprising:

a housing;

a stop element axially movable within said housing between a first non-limiting position and a second position at which said stop element comprises a limit stop for a movable element;

a coupling element rotatably mounted upon said housing;

a clamping element rotatably fixed upon said coupling element and axially movable within said housing between a first position at which said clamping element is disengaged from said stop element so as to permit said stop element to undergo movement within said housing between said first non-limiting position and said second limit stop position, and a second position at which said clamping element is engaged with said stop element so as to fix said stop element at said second position at which said stop element comprises said limit stop for a movable element;

first means defined between said clamping element and said housing for causing axial movement of said clamping element with respect to said coupling element in response to rotatable movement of said coupling element, and said clamping element rotatably fixed thereto, with respect to said housing; and second means defined between said coupling element and said clamping element for causing radially inward movement of a portion of said clamping element, in response to said axial movement of said clamping element with respect to said coupling element, such that said portion of said clamping element clampingly engages said stop element so as to fix said stop element at said second limit stop position when said stop element is moved from said first non-limiting position to said second limit stop position.

10. A stop system as set forth in claim 9, wherein:

said first means defined between said clamping element and said housing comprises first and second inclined ramp cams defined upon a first end portion of said clamping element and said housing.

11. A stop system as set forth in claim 10, wherein:

said second means defined between said coupling element and said clamping element comprises inclined cam surface means defined upon said coupling element for engaging end surface means defined upon a second end portion of said clamping element.

12. A stop system as set forth in claim 9, wherein:

said stop element comprises a shank portion disposed within said housing, and a head portion comprising said limit stop for a movable element when said shank portion of said stop element is fixed at said second position within said housing as a result of being clampingly engaged by said radially inwardly moved portion of said clamping element.

13. A stop system as set forth in claim 12, wherein:

said stop element comprises a substantially rigid core defining said head portion and said shank portion;

said head portion is covered with an elastomeric material; and an annular region of said shank portion, which is clampingly engaged by said portion of said clamping element, is surrounded by an elastomeric material.

14. A stop system as set forth in claim 9, wherein:

said coupling element comprises a plurality of axially extending legs; and said clamping element comprises a plurality of axially extending slots within which said axially extending legs of said coupling element are disposed for preventing relative rotation between said coupling element and said clamping element and yet permitting relative axial movement of said clamping element with respect to said coupling element.

15. A stop system as set forth in claim 9, wherein:

said housing comprises a flange portion; and said coupling element comprises an annular groove within which an edge portion of said flange portion of said housing is disposed such that said coupling element is rotatably mounted upon said housing.

16. A stop system as set forth in claim 9, wherein:

an external portion of said coupling element has a substantially hexagonal configuration for facilitating rotation of said coupling element by a wrench tool.

17. A method of fixing an adjustable limit stop for a movable element, comprising the steps of:

providing a housing;

disposing a clamping element within said housing;

mounting a coupling element upon said housing such that said coupling element is rotatable with respect to said housing, and is engaged with said clamping element such that said clamping element is rotatably fixed but axially movable with respect to said coupling element;

mounting an axially movable stop element within said housing such that said stop element is disposed at a first non-limiting position with respect to said housing;

providing first means upon said clamping element and said housing for causing axial movement of said clamping element with respect to said coupling element in response to rotatable movement of said coupling element, and said clamping element rotatably fixed thereto, with respect to said housing;

providing second means upon said coupling element and said clamping element for causing radially inward movement of a portion of said clamping element in response to said axial movement of said clamping element with respect to said coupling element;

moving said stop element within said housing from said first non-limiting position to a second limit stop position at which said stop element comprises a positional limit stop for a movable element; and rotating said coupling element, and said clamping element rotatably fixed thereto, with respect to said housing such that said first means causes axial movement of said clamping element with respect to said coupling element, and said second means causes radially inward movement of said portion of said clamping element whereby said portion of said clamping element clampingly engages said stop element so as to fix said stop element at said second limit stop position.

18. The method as set forth in claim 17, further comprising the steps of:

providing said housing with a flange portion; and providing said coupling element with an annular groove for accommodating an edge portion of said flange portion of said housing whereby said coupling element is rotatably mounted upon said housing.

19. The method as set forth in claim 17, further comprising the steps of:

providing an external portion of said coupling element with a substantially hexagonal configuration; and rotating said coupling element by engaging said external hexagonal portion of said coupling element with a wrench tool.

20. The method as set forth in claim 17, further comprising the step of:

forming said first and second means upon said clamping element, said coupling element, and said housing as inclined cam surfaces.

* * * * *